United States Patent
Lin

(10) Patent No.: US 9,973,100 B2
(45) Date of Patent: May 15, 2018

(54) SYNCHRONOUS RECTIFIER APPLIED TO A POWER CONVERTER AND OPERATION METHOD THEREOF

(71) Applicant: Leadtrend Technology Corp., Hsinchu County (TW)

(72) Inventor: Chung-Wei Lin, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days. days.

(21) Appl. No.: 15/403,177

(22) Filed: Jan. 11, 2017

(65) Prior Publication Data

US 2017/0207715 A1 Jul. 20, 2017

(30) Foreign Application Priority Data

Jan. 14, 2016 (TW) .............................. 105101045 A

(51) Int. Cl.
H02M 3/335 (2006.01)

(52) U.S. Cl.
CPC ..... H02M 3/33592 (2013.01); *Y02B 70/1475* (2013.01)

(58) Field of Classification Search
CPC ......... H02M 3/33576; H02M 3/33592; H02M 3/33553; H02M 3/33507
See application file for complete search history.

(56) References Cited

U.S. PATENT DOCUMENTS

| 2006/0087868 | A1 | 4/2006 | Jang |
| 2007/0205964 | A1* | 9/2007 | Nagaki ................. G09G 3/296 345/60 |
| 2013/0094249 | A1* | 4/2013 | Hsu ........................ H02M 1/08 363/21.01 |

FOREIGN PATENT DOCUMENTS

| TW | 201206030 A1 | 2/2012 |
| TW | 201318318 A1 | 5/2013 |
| TW | 201419722 A | 5/2014 |
| TW | 201511450 A | 3/2015 |

\* cited by examiner

*Primary Examiner* — Adolf Berhane
*Assistant Examiner* — Afework Demisse
(74) *Attorney, Agent, or Firm* — Winston Hsu

(57) ABSTRACT

A synchronous rectifier applied to a power converter includes a power supply module, a control module, and a gate driving unit. The power supply module is used for generating a supply current according to an induced voltage generated from a secondary side of the power converter, wherein the supply current is used for establishing a supply voltage, and the induced voltage corresponds to a control signal of a power switch of a primary side of the power converter. The control module is coupled to the power supply module for turning on or turning off the power supply module according to the supply voltage. The gate driving unit is coupled to the power supply module for generating a gate control signal controlling turning-on and turning-off of a synchronous switch of the secondary side of the power converter, wherein the supply voltage is used for driving the gate driving unit.

8 Claims, 5 Drawing Sheets

SYNCHRONOUS RECTIFIER APPLIED TO A POWER CONVERTER AND OPERATION METHOD THEREOF

BACKGROUND OF THE INVENTION

1. Field of the Invention

The present invention relates to a synchronous rectifier applied to a power converter and an operation method thereof, and particularly to a synchronous rectifier and an operation method thereof that can generate a supply voltage independent of an output voltage of a secondary side of the power converter and do not need an auxiliary winding of a primary side of the power converter.

2. Description of the Prior Art

When an alternating current (AC)/direct current (DC) power converter is applied to a charge system, sometimes an output voltage of a secondary side of the AC/DC power converter is decreased to very low potential because the charge system needs to full charge an electronic product electrically connected to the charge system. When the output voltage of the secondary side of the AC/DC power converter is decreased to very low potential, if a synchronous rectifier of the secondary side of the AC/DC power converter needs the output voltage to act as a supply voltage, meanwhile the synchronous rectifier cannot operate normally because the output voltage is decreased to very low potential, resulting in conversion efficiency of the AC/DC power converter being reduced and the AC/DC power converter having serious heating problem.

The prior art utilizes an auxiliary voltage generated by an auxiliary winding of a primary side of the AC/DC power converter to act as the supply voltage of the synchronous rectifier, but the auxiliary winding will increase cost of the AC/DC power converter and design complexity. Therefore, for a designer of the synchronous rectifier, how to improve the above mentioned disadvantages of the prior art becomes an important issue.

SUMMARY OF THE INVENTION

An embodiment of the present invention provides a synchronous rectifier applied to a power converter. The synchronous rectifier includes a power supply module, a control module, and a gate driving unit. The power supply module is used for generating a supply current according to an induced voltage generated from a secondary side of the power converter, wherein the supply current is used for establishing a supply voltage, and the induced voltage corresponds to a control signal of a power switch of a primary side of the power converter. The control module is coupled to the power supply module for turning on or turning off the power supply module according to the supply voltage. The gate driving unit is coupled to the power supply module for generating a gate control signal controlling turning-on and turning-off of a synchronous switch of the secondary side of the power converter according to the induced voltage, wherein the supply voltage is used for driving the gate driving unit.

Another embodiment of the present invention provides an operation method of a synchronous rectifier applied to a power converter, wherein the synchronous rectifier includes a power supply module, a control module, and a gate driving unit. The operation method includes the power supply module generating a supply current according to an induced voltage generated from a secondary side of the power converter, wherein the supply current is used for establishing a supply voltage, and the induced voltage corresponds to a control signal of a power switch of a primary side of the power converter; and the control module turning on or turning off the power supply module according to the supply voltage.

The present invention provides a synchronous rectifier applied to a power converter and an operation method thereof. The synchronous rectifier and the operation method utilize a power supply module to establish a supply voltage of a gate driving unit according to an induced voltage generated from a secondary side of the power converter, wherein the induced voltage generated from the secondary side of the power converter corresponds to a control signal of a power switch of a primary side of the power converter, so the supply voltage of the gate driving unit is independent of an output voltage of the secondary side of the power converter. Therefore, compared to the prior art, because the supply voltage of the gate driving unit is independent of the output voltage of the secondary side of the power converter, the gate driving unit of the present invention can still operate normally when the output voltage of the secondary side of the power converter is reduced to very low potential. In addition, because the present invention does not need an auxiliary voltage generated by an auxiliary winding of the primary side of the power converter to act as the supply voltage of the gate driving unit, the present invention has lower cost and simpler design.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
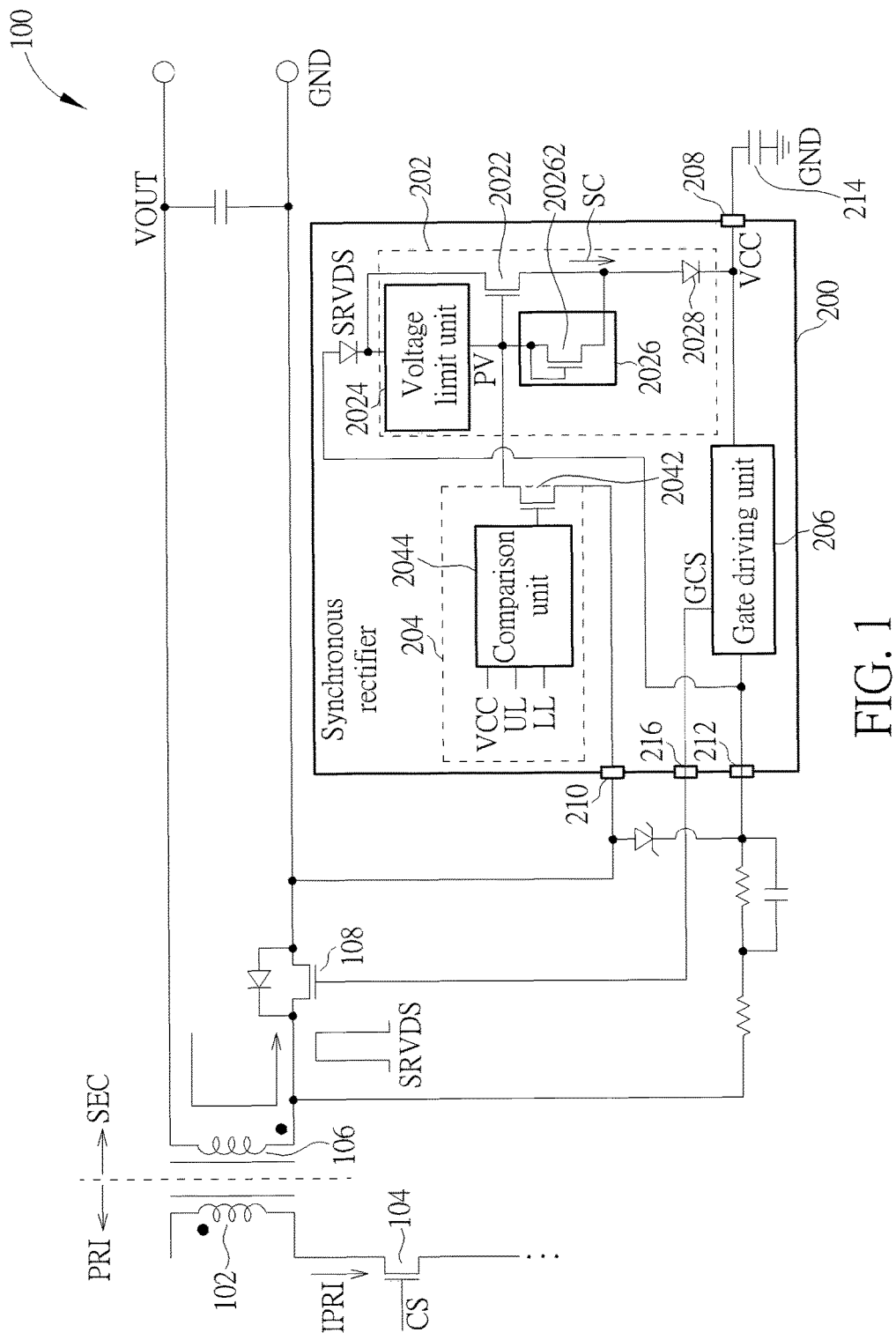
FIG. 1 is a diagram illustrating a synchronous rectifier applied to a secondary side of a power converter according to a first embodiment of the present invention.

Please refer to FIG. 1. FIG. 1 is a diagram illustrating a synchronous rectifier 200 applied to a secondary side SEC of a power converter 100 according to a first embodiment of the present invention, wherein a primary side PRI of the power converter 100 only shows a primary winding 102 and a power switch 104 in FIG. 1, and the power converter 100 is an alternating current/direct current power converter. As shown in FIG. 1, the synchronous rectifier 200 includes a power supply module 202, a control module 204, and a gate driving unit 206, the power supply module 202 includes a high voltage switch 2022, a voltage limit unit 2024, a gate clamping unit 2026, and a diode 2028, and the control module 204 includes a switch 2042 and a comparison unit 2044. As shown in FIG. 1, the voltage limit unit 2024 is coupled between a gate terminal of the high voltage switch 2022 and a drain terminal of the high voltage switch 2022, the gate clamping unit 2026 is coupled between a source terminal of the high voltage switch 2022 and the gate terminal of the high voltage switch 2022, and the diode 2028 is coupled between the source terminal of the high voltage switch 2022 and a pin 208 of the synchronous rectifier 200, wherein the gate clamping unit 2026 is a clamp circuit. The switch 2042 is coupled between the gate terminal of the high voltage switch 2022 and ground GND of the power converter 100, and the comparison unit 2044 is coupled to the switch 2042 and the pin 208, wherein the switch 2042 is coupled to the ground GND of the power converter 100 through a pin 210 of the synchronous rectifier 200.

As shown in FIG. 1, when the power switch 104 of the primary side PRI of the power converter 100 is turned on according to a control signal CS, a secondary winding 106 of the secondary side SEC of the power converter 100 can generate an induced voltage SRVDS (corresponding to the control signal CS of the power switch 104) according to a current IPRI flowing through the primary side PRI of the power converter 100. As shown in FIG. 1, when the switch 2042 is turned off, the high voltage switch 2022 can receive the induced voltage SRVDS through a pin 212 of the synchronous rectifier 200, and generate a supply current SC according to the induced voltage SRVDS, wherein the supply current SC is used for charging a capacitor 214 to establish a supply voltage VCC through the pin 208 of the synchronous rectifier 200. Meanwhile, because high potential of the induced voltage SRCDS can damage the gate terminal of the high voltage switch 2022, the voltage limit unit 2024 can limit the induced voltage SRCDS to a predetermined voltage PV to protect the gate terminal of the high voltage switch 2022, wherein the predetermined voltage PV is lower than the induced voltage SRVDS, and the voltage limit unit 2024 is a Junction Field Effect Transistor (JFET). But, the present invention is not limited to the voltage limit unit 2024 being a JFET. The gate clamping unit 2026 includes a transistor 20262 for clamping a voltage between the gate terminal of the high voltage switch 2022 and the source terminal of the high voltage switch 2022. That is to say, the gate clamping unit 2026 can utilize the transistor 20262 to clamp the voltage between the gate terminal of the high voltage switch 2022 and the source terminal of the high voltage switch 2022 to protect the high voltage switch 2022 to make the high voltage switch 2022 operate normally. But, the present invention is not limited to the gate clamping unit 2026 including the transistor 20262, that is, the gate clamping unit 2026 can include at least one transistor. The diode 2028 is used for preventing the supply voltage VCC from reversing to the gate clamping unit 2026 and the high voltage switch 2022 when the high voltage switch 2022 is turned off.

Figure 2:
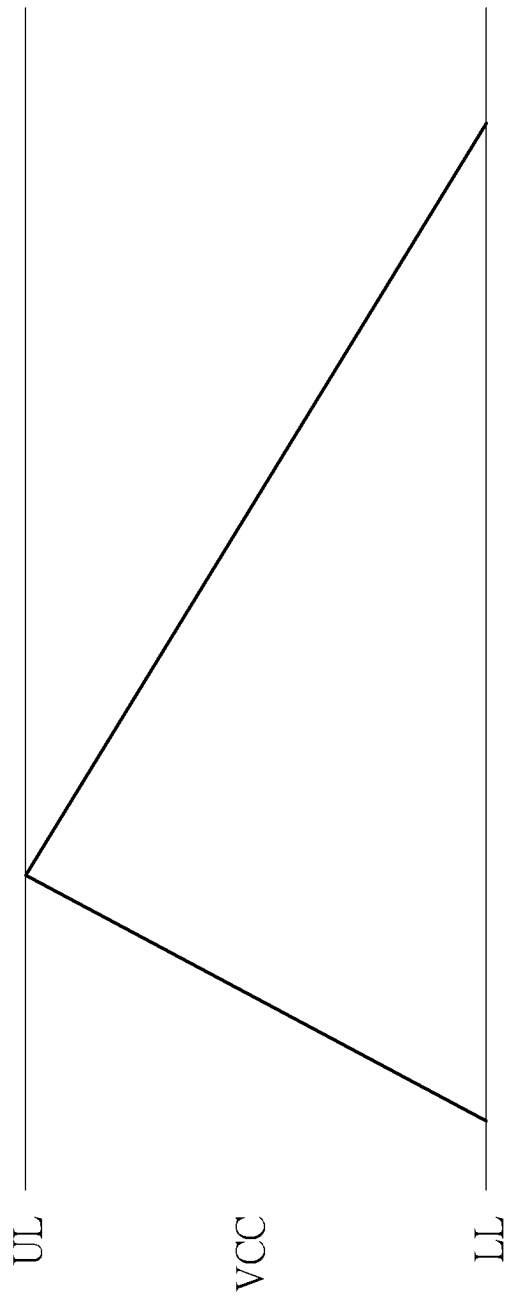
FIG. 2 is a diagram illustrating the supply voltage being changed between the upper limit and the lower limit.

Please refer to FIGS. 1, 2. When the supply voltage VCC is greater than an upper limit UL, the comparison unit 2044 can make the switch 2042 be turned on, resulting in the high voltage switch 2022 being turned off (because potential of the gate terminal of the high voltage switch 2022 is pulled down to the ground GND). Meanwhile, the supply voltage VCC of the capacitor 214 is gradually decreased with a load (not shown in FIG. 1) coupled to the secondary side SEC of the power converter 100; and when the supply voltage VCC is decreased to be less than a lower limit LL, the comparison unit 2044 can make the switch 2042 be turned off, resulting in the high voltage switch 2022 being turned on again. Meanwhile, the power supply module 202 can utilize the supply current SC to charge the capacitor 214 again to make the supply voltage VCC be increased. Therefore, as shown in FIG. 2, the supply voltage VCC is changed between the upper limit UL and the lower limit LL. In addition, in another embodiment of the present invention, the comparison unit 2044 is a hysteresis comparator, so the comparison unit 2044 can utilize the supply voltage VCC, the upper limit UL, and a hysteresis range of the comparison unit 2044 to make the supply voltage VCC be changed between the upper limit UL and the lower limit LL.

Figure 3:
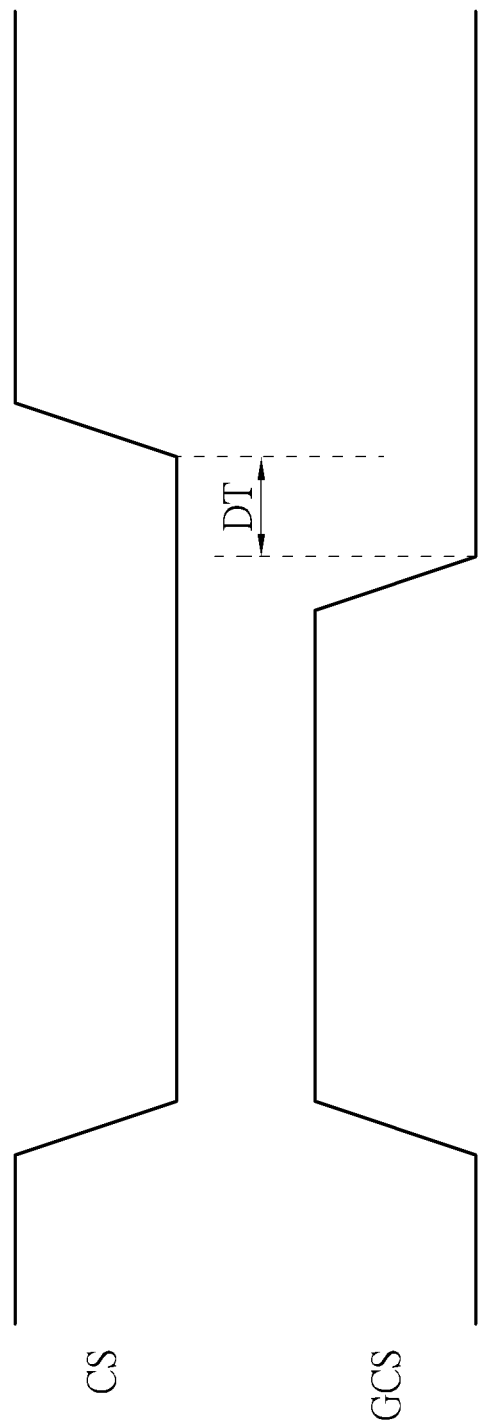
FIG. 3 is a diagram illustrating a relationship between the gate control signal and the control signal.

As shown in FIG. 1, the gate driving unit 206 can receive the induced voltage SRVDS from a drain terminal of the synchronous switch 108 of the secondary side SEC of the power converter 100 through the pin 212 of the synchronous rectifier 200, and generate a gate control signal GCS controlling turning-on and turning-off of the synchronous switch 108 of the secondary side SEC of the power converter 100 according to the induced voltage SRVDS, wherein the gate control signal GCS can be transmitted to a gate terminal of the synchronous switch 108 through a pin 216 of the synchronous rectifier 200, and the supply voltage VCC is used for driving the gate driving unit 206. In addition, because the power converter 100 is a flyback power converter, the gate control signal GCS can make the primary side PRI of the power converter 100 and the secondary side SEC of the power converter 100 be not simultaneously turned on. As shown in FIG. 3, the gate control signal GCS and the control signal CS are not overlapped each other because of a dead time DT, so the gate control signal GCS can prevent the primary side PRI of the power converter 100 and the secondary side SEC of the power converter 100 from being simultaneously turned on. In addition, in another embodiment of the present invention, the supply voltage VCC is further used for driving a monitor unit applied to the secondary side SEC of the power converter 100 or other circuits needing the supply voltage VCC (wherein the monitor unit and the other circuits are not shown in FIG. 1), wherein the monitor unit can be used for monitoring timings of the gate control signal GCS and the control signal CS.

Figure 4:
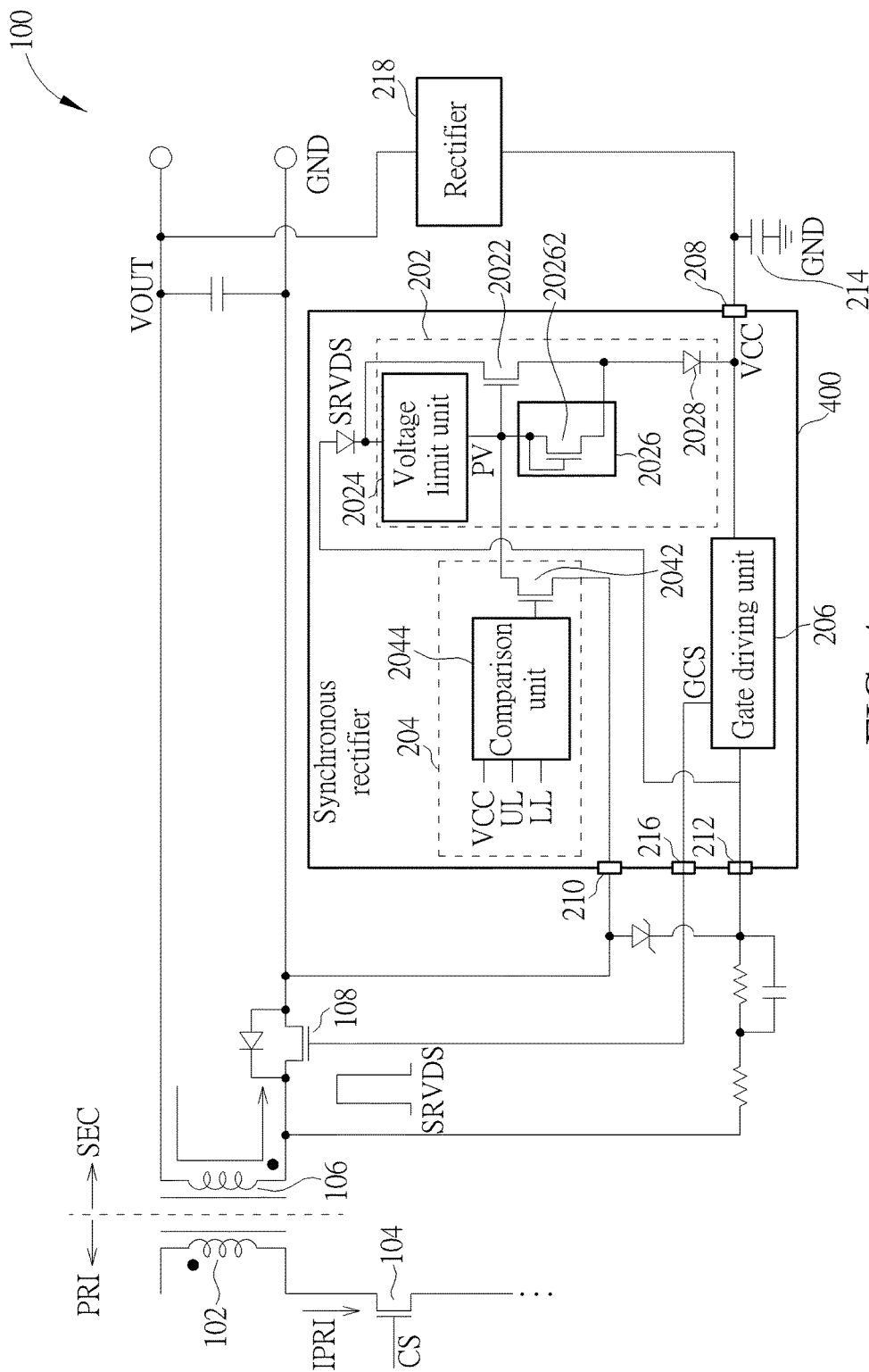
FIG. 4 is a diagram illustrating a synchronous rectifier applied to the secondary side of the power converter according to a second embodiment of the present invention.

Please refer to FIG. 4. FIG. 4 is a diagram illustrating a synchronous rectifier 400 applied to the secondary side SEC of the power converter 100 according to a second embodiment of the present invention. As shown in FIG. 4, a difference between the synchronous rectifier 400 and the synchronous rectifier 200 is that a gate driving unit 206 of the synchronous rectifier 400 is further driven by an output voltage VOUT of the secondary side SEC of the power converter 100, wherein the output voltage VOUT charges the capacitor 214 through a rectifier 218. In addition, subsequent operational principles of the synchronous rectifier 400 are the same as those of the synchronous rectifier 200, so further description thereof is omitted for simplicity.

Figure 5:
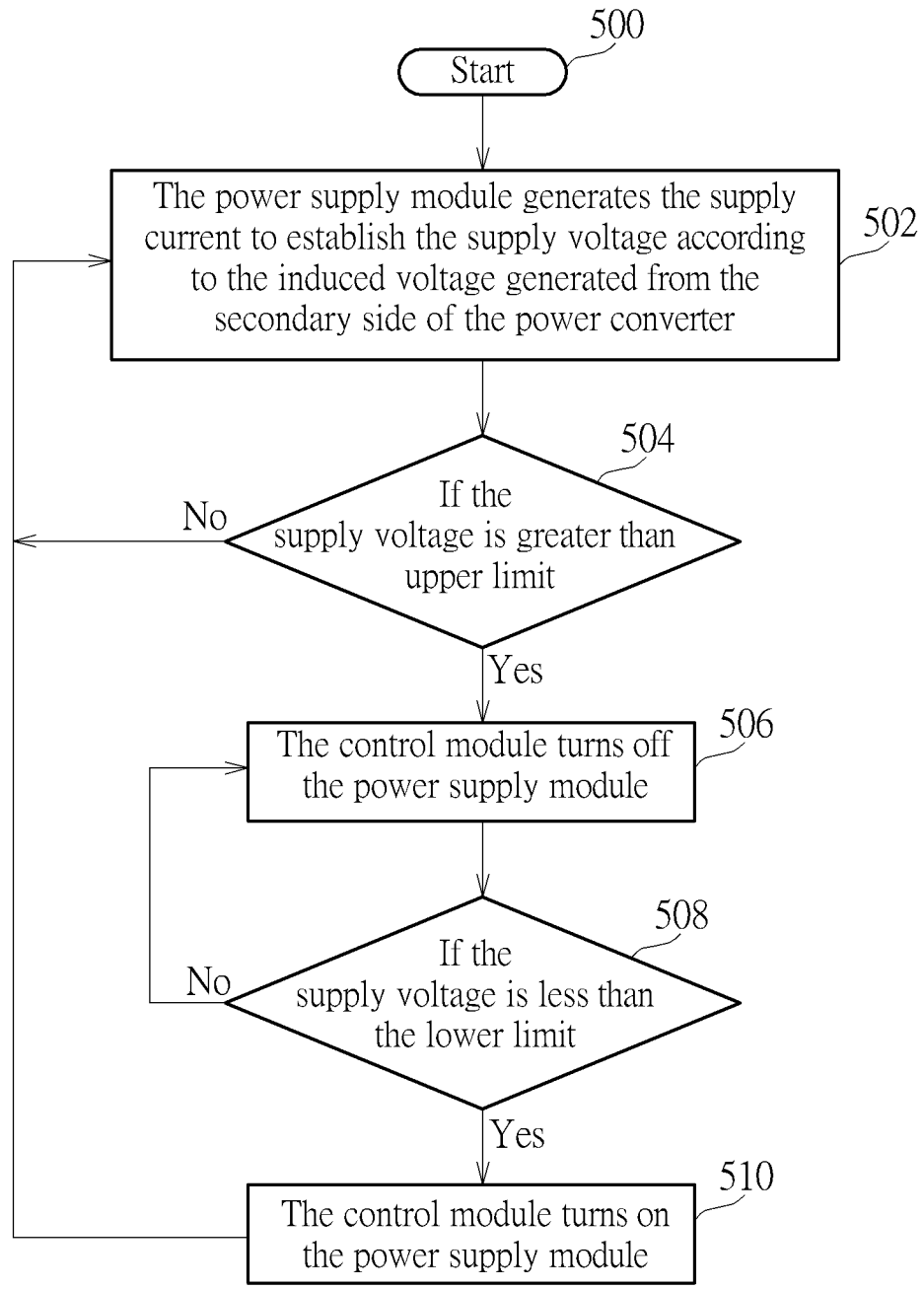
FIG. 5 is a flowchart illustrating an operation method of a synchronous rectifier applied to a power converter according to a third embodiment of the present invention.

Please refer to FIGS. 1-3 and FIG. 5. FIG. 5 is a flowchart illustrating an operation method of a synchronous rectifier applied to a power converter according to a third embodiment of the present invention. The operation method in FIG. 5 is illustrated using the power converter 100 and the synchronous rectifier 200 in FIG. 1. Detailed steps are as follows:

Step 500: Start.

Step 502: The power supply module 202 generates the supply current SC to establish the supply voltage VCC according to the induced voltage SRVDS generated from the secondary side SEC of the power converter 100.

Step 504: If the supply voltage VCC is greater than upper limit UL; if yes, go to Step 506; if no, go to Step 502;

Step 506: The control module 204 turns off the power supply module 202.

Step 508: If the supply voltage VCC is less than the lower limit LL; if yes, go to Step 510; if no, go to Step 506.

Step 510: The control module 204 turns on the power supply module 202, go to Step 502.

In Step 502, as shown in FIG. 1, when the power switch 104 of the primary side PRI of the power converter 100 is turned on according to the control signal CS, the secondary winding 106 of the secondary side SEC of the power converter 100 can generate the induced voltage SRVDS (corresponding to the control signal CS of the power switch 104) according to the current IPRI flowing through the primary side PRI of the power converter 100. As shown in FIG. 1, when the switch 2042 of the control module 204 is turned off, the high voltage switch 2022 of the power supply module 202 can receive the induced voltage SRVDS through the pin 212 of the synchronous rectifier 200, and generate the supply current SC according to the induced voltage SRVDS, wherein the supply current SC is used for charging the capacitor 214 to establish the supply voltage VCC through the pin 208 of the synchronous rectifier 200.

In Step 506, as shown in FIGS. 1, 2, when the supply voltage VCC is greater than the upper limit UL, the comparison unit 2044 of the control module 204 can make the switch 2042 be turned on, resulting in the high voltage switch 2022 being turned off (because the potential of the gate terminal of the high voltage switch 2022 is pulled down to the ground GND). Meanwhile, the supply voltage VCC of the capacitor 214 is gradually decreased with the load (not shown in FIG. 1) coupled to the secondary side SEC of the power converter 100; in Step 510, when the supply voltage VCC is decreased to be less than the lower limit LL, the comparison unit 2044 can make the switch 2042 be turned off, resulting in the high voltage switch 2022 being turned on again. Meanwhile, the power supply module 202 can utilize the supply current SC to charge the capacitor 214 again to make the supply voltage VCC be increased. Therefore, as shown in FIG. 2, the supply voltage VCC is changed between the upper limit UL and the lower limit LL.

As shown in FIG. 1, because the supply voltage VCC can drive the gate driving unit 206, the gate driving unit 206 can generate the gate control signal GCS controlling turning-on and turning-off of the synchronous switch 108 of the secondary side SEC of the power converter 100 according to the induced voltage SRVDS, wherein the gate control signal GCS can make the primary side PRI of the power converter 100 and the secondary side SEC of the power converter 100 be not simultaneously turned on (as shown in FIG. 3, the gate control signal GCS and the control signal CS are not overlapped each other because of the dead time DT, so the gate control signal GCS can prevent the primary side PRI of the power converter 100 and the secondary side SEC of the power converter 100 from being simultaneously turned on).

To sum up, the synchronous rectifier applied to a power converter and the operation method thereof utilize the power supply module to establish the supply voltage of the gate driving unit according to the induced voltage generated from the secondary side of the power converter, wherein the induced voltage generated from the secondary side of the power converter corresponds to the control signal of the power switch of the primary side of the power converter, so the supply voltage of the gate driving unit is independent of the output voltage of the secondary side of the power converter. Therefore, compared to the prior art, because the supply voltage of the gate driving unit is independent of the output voltage of the secondary side of the power converter, the gate driving unit of the present invention can still operate normally when the output voltage of the secondary side of the power converter is reduced to very low potential. In addition, because the present invention does not need an auxiliary voltage generated by an auxiliary winding of the primary side of the power converter to act as the supply voltage of the gate driving unit, the present invention has lower cost and simpler design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronous rectifier applied to a power converter, comprising:
   a power supply module for generating a supply current according to an induced voltage generated from a secondary side of the power converter, wherein the supply current is used for establishing a supply voltage, and the induced voltage corresponds to a control signal of a power switch of a primary side of the power converter, wherein the power supply module comprises:
      a high voltage switch for generating the supply current according to the induced voltage;
      a voltage limit unit coupled to a synchronous switch and the high voltage switch for limiting the induced voltage to a predetermined voltage to protect a gate terminal of the high voltage switch;
      a gate clamping unit coupled to the voltage limit unit and the high voltage switch for clamping a voltage between the gate terminal of the high voltage switch and a source terminal of the high voltage switch; and
      a diode coupled to the gate clamping unit, the high voltage switch, and a gate driving unit for preventing the supply voltage from reversing to the gate clamping unit and the high voltage switch when the high voltage switch is turned off;
   a control module coupled to the power supply module for turning on or turning off the power supply module according to the supply voltage; and
   the gate driving unit coupled to the power supply module for generating a gate control signal controlling turning-on and turning-off of the synchronous switch of the secondary side of the power converter according to the induced voltage, wherein the supply voltage is used for driving the gate driving unit.

2. The synchronous rectifier of claim 1, wherein the supply voltage is further used for driving a monitor unit applied to the secondary side of the power converter.

3. The synchronous rectifier of claim 1, wherein the gate clamping unit comprises at least one transistor.

4. The synchronous rectifier of claim 1, wherein the voltage limit unit is a Junction Field Effect Transistor (JFET).

5. The synchronous rectifier of claim 1, wherein the gate driving unit is further driven by an output voltage of the secondary side of the power converter.

6. A synchronous rectifier applied to a power converter, comprising:
   a power supply module for generating a supply current according to an induced voltage generated from a secondary side of the power converter, wherein the supply current is used for establishing a supply voltage, and the induced voltage corresponds to a control signal of a power switch of a primary side of the power converter;

a control module coupled to the power supply module for turning on or turning off the power supply module according to the supply voltage, wherein the control module comprises:
- a switch coupled to the power supply module; and
- a comparison unit for turning off the power supply module through the switch when the supply voltage is greater than an upper limit, and turning on the power supply module through the switch when the supply voltage is less than a lower limit; and a gate driving unit coupled to the power supply module for generating a gate control signal controlling turning-on and turning-off of a synchronous switch of the secondary side of the power converter according to the induced voltage, wherein the supply voltage is used for driving the gate driving unit.

7. An operation method of a synchronous rectifier applied to a power converter, wherein the synchronous rectifier includes a power supply module, a control module, and a gate driving unit, the operation method comprising:

the power supply module generating a supply current according to an induced voltage generated from a secondary side of the power converter, wherein the supply current is used for establishing a supply voltage, and the induced voltage corresponds to a control signal of a power switch of a primary side of the power converter;

the control module turning off the power supply module when the supply voltage is greater than an upper limit; and the control module turning on the power supply module when the supply voltage is less than a lower limit.

8. The operation method of claim 7, further comprising:

the gate driving unit generating a gate control signal controlling turning-on and turning-off of a synchronous switch of the secondary side of the power converter according to the induced voltage, wherein the supply voltage is used for driving the gate driving unit.

* * * * *